United States Patent
Schüssler et al.

(10) Patent No.: US 10,779,545 B2
(45) Date of Patent: Sep. 22, 2020

(54) DEVICE FOR PRODUCING A BAKED GOOD

(71) Applicant: BSH Hausgeräte GmbH, München (DE)

(72) Inventors: Andreas Schüssler, München (DE); Lucia Schuster, München (DE); Sebastian Winner, Iserlohn (DE); Evgeni Rehfuss, München (DE); Anne Peijan, Bensdorf (DE); Manuel Fischer, Schechen (DE); Rudolf Metz, Brunnthal (DE)

(73) Assignee: BSH Hausgerặte GmbH, Munich (DE)

( * ) Notice: Subject to any disclaimer, the term of this patent is extended or adjusted under 35 U.S.C. 154(b) by 367 days.

(21) Appl. No.: 15/563,684

(22) PCT Filed: Mar. 15, 2016

(86) PCT No.: PCT/EP2016/055543
§ 371 (c)(1),
(2) Date: Oct. 2, 2017

(87) PCT Pub. No.: WO2016/156027
PCT Pub. Date: Oct. 6, 2016

(65) Prior Publication Data
US 2018/0146685 A1 May 31, 2018

(30) Foreign Application Priority Data
Mar. 30, 2015 (DE) .......... 10 2015 205 706

(51) Int. Cl.
*A21B 1/00* (2006.01)
*A21B 7/00* (2006.01)
*A21B 5/02* (2006.01)

(52) U.S. Cl.
CPC ............... *A21B 7/005* (2013.01); *A21B 5/02* (2013.01)

(58) Field of Classification Search
CPC .............. A21B 7/005; A21B 5/02; H05B 1/02
(Continued)

(56) References Cited

U.S. PATENT DOCUMENTS 5,146,840 A * 9/1992 Hedenberg ............ A21B 7/005 206/219
5,967,021 A * 10/1999 Yung ...................... A21B 7/005 366/144

(Continued)

FOREIGN PATENT DOCUMENTS

| CN | 1171723 A | 1/1998 |
|----|-----------|--------|
| CN | 1867260 A | 11/2006 |

(Continued)

OTHER PUBLICATIONS

International Search Report for PCT/EP2016/055543, dated May 24, 2016, 2 pages.

(Continued)

*Primary Examiner* — Mark H Paschall
(74) *Attorney, Agent, or Firm* — Nixon & Vanderhye P.C.

(57) ABSTRACT

The invention relates to a device for producing a baked good. The device comprises an accommodating unit, which is designed to accommodate a capsule, wherein the capsule comprises ingredients for producing a baked good. Furthermore, the device comprises a baking unit, which is designed to bake a dough, and an output unit for outputting a baked good baked in the baking unit. In addition, the device comprises a control unit, which is designed to cause dough, which comprises the ingredients from a capsule inserted into the accommodating unit, to be baked in the baking unit. The control unit is also designed to cause the baked good baked from the dough to be output by means of the output unit.

13 Claims, 1 Drawing Sheet

(58) Field of Classification Search
USPC .................. 99/384, 339, 380; 219/494, 388
See application file for complete search history.

(56) References Cited

U.S. PATENT DOCUMENTS

2013/0101714 A1    4/2013  Buehler
2014/0161946 A1*   6/2014  Torricelli .............. A21B 7/005
                                                         426/233

FOREIGN PATENT DOCUMENTS

| CN | 2870688 Y | 2/2007 |
|---|---|---|
| CN | 101309622 A | 11/2008 |
| CN | 201316176 Y | 9/2009 |
| CN | 201452940 U | 5/2010 |
| CN | 102144897 A | 8/2011 |
| CN | 102824119 A | 12/2012 |
| CN | 102973163 A | 3/2013 |
| CN | 202981676 U | 6/2013 |
| CN | 103371738 A | 10/2013 |
| CN | 103654457 A | 3/2014 |
| CN | 103948327 A | 7/2014 |
| CN | 203987703 U | 12/2014 |
| CN | 204016049 U | 12/2014 |
| DE | 299 18 836 U1 | 3/2001 |
| DE | 102 32 133 A1 | 1/2004 |
| DE | 10 2009 024 058 B3 | 10/2010 |
| DE | 10 2010 034791 | 8/2011 |
| DE | 10 2010 064113 | 6/2012 |
| DE | 20 2012 006367 | 10/2012 |
| WO | WO 99/08537 A1 | 2/1999 |
| WO | WO 2013/124809 A2 | 8/2013 |

OTHER PUBLICATIONS

Written Opinion of the ISA for PCT/EP2016/055543, dated May 24, 2016, 8 pages.
International Preliminary Report on Patentability for PCT/EP2016/055543 dated May 24, 2017, 21 pages.
English Translation of International Preliminary Report on Patentability for PCT/EP2016/055543 dated May 24, 2017, 5 pages.

* cited by examiner

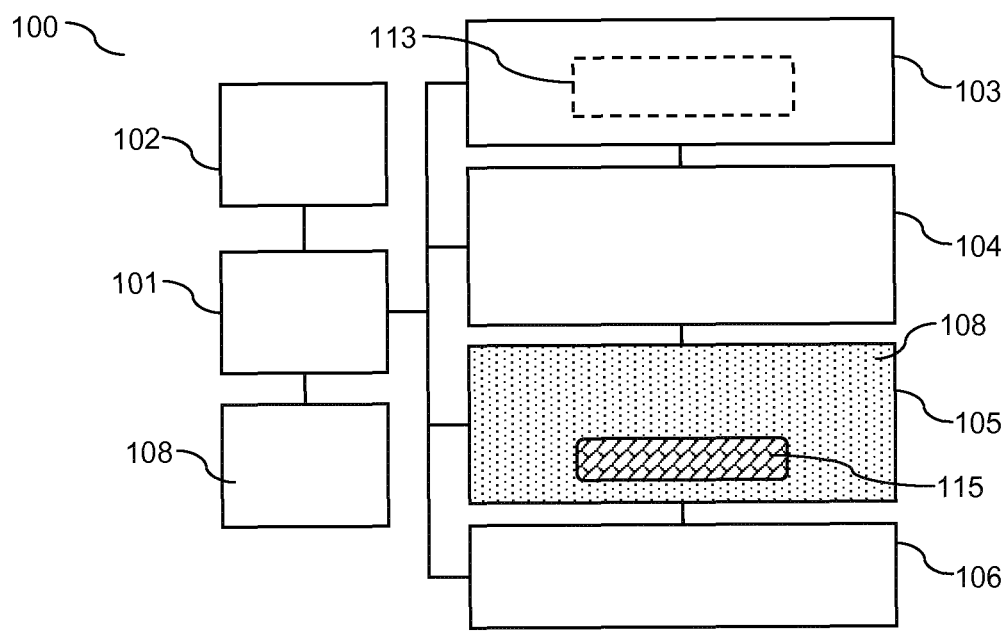

DEVICE FOR PRODUCING A BAKED GOOD

This application is the U.S. national phase of International Application No. PCT/EP2016/055543 filed Mar. 15, 2016 which designated the U.S. and claims priority to DE Patent Application No. 102015205706.2 filed Mar. 30, 2015, the entire contents of each of which are hereby incorporated by reference.

The invention relates to a device for producing baked goods, in particular for producing an individual portion of a baked product.

Automatic coffee makers, in particular espresso machines, are known that enable a user to make a cup of coffee in an individualized manner. Here, when making the cup of coffee, parameters determining the taste, such as the quantity of water or the quantity of coffee powder, may be adjusted individually to the preferences of the user.

Many users like to consume a sweet baked item, such as a cookie, with a cup of coffee. The present document addresses the technical object of providing a device that enables a user to produce a baked product efficiently and in an individualized manner.

The object is achieved by the subject matter of the independent claims. Advantageous embodiments are defined in particular in the dependent claims, described in the description below or illustrated in the attached drawing.

According to one aspect of the invention, a device for producing a baked product is described. In particular, using the device, an individual portion of a baked product can be produced, for example a single cookie. The device includes a receiving unit that is configured to receive a capsule (or pod). Here, the capsule includes contents for producing a baked product. In particular, the capsule may hold a quantity of contents that is sufficient for producing exactly one single baked product. In other words, the quantity of contents in a capsule may be exactly of a portion for producing a single baked product.

The receiving unit may have an (optionally closable) opening through which the capsule can be inserted into the device. Moreover, the receiving unit may be configured to open the capsule in order to release the contents of the capsule. The capsule is typically closed in air-tight manner for the purpose of storage. One side of the capsule may be formed by a foil, and the receiving unit may be configured to remove the foil from the capsule or to pierce the foil of the capsule in order to release the contents of the capsule.

The device may include a liquid container for receiving water or another liquid, for example milk. The contents of the capsule may include a baking mix for the baked product. Moreover, the device may include a mixer that is configured to produce, from the baking mix and liquid from the liquid container, the dough for the baked product. The use of capsules having baking mixes makes it possible to use relative compact and lightweight capsules. In particular, a capsule may be so compact that the capsule has a volume or capacity that corresponds substantially to the volume of the contents therein. For example, the capacity of a capsule may exceed the volume of contents of the capsule by only 20%, 10% or less.

The device may also be configured to process a baking mix that already contains the liquid required for the dough. In this case, the liquid may be contained in a separated partial region of the capsule and so be kept apart from other, dry constituents of the baking mix, for the purpose of easier storage, or the baking mix may be a moist composition that is in particular ready for further processing. In a case of this kind, the function of the mixer is optionally limited to removing the composition from the capsule and kneading and shaping it as may be required for forming the desired baked product. In that case, a container for liquid is not required in a device of this kind.

The device further includes a baking unit that is configured to bake a dough. Furthermore, the device includes a discharge unit for discharging a baked product that has been baked in the baking unit. Moreover, the device includes a control unit that is configured to trigger the production of a dough from the contents of a capsule inserted into the receiving unit and the baking of the dough in the baking unit. The control unit is further configured to trigger the discharge, by way of the discharge unit, of an individual portion of the baked product that has been baked from the dough.

The device thus makes it possible for a user to produce an individual portion of a baked product in a simple manner. In particular, by inserting a compact capsule into the receiving unit of the device, an individual portion of a baked product may be produced from the contents of the inserted capsule.

The baking unit may be configured to bake the dough at least partly by the action of a heated gaseous medium. In other words, in the baking unit a baking procedure in which the dough can expand and the baked product can obtain a crispy surface and texture can be carried out.

As an alternative or in addition to the use of capsules having a baking mix, the contents of a capsule may include the dough for the baked product. The prepared dough from the capsule may thus be used directly for producing the baked product (for example for baking in the baking unit). In this way, production of the baked product may be made faster.

The capsule may have an identification arrangement. The identification arrangement may for example include a QR code, a bar code, a magnetic chip, an electronic chip, an external appearance of the capsule, an identification pattern and/or an identification number. The control unit may be configured to determine, on the basis of the identification arrangements, information on the baked product that can be produced from the contents of the capsule. The information on the baked product may indicate how the baked product is to be produced by the device. In particular, the information on the baked product may include for example a baking temperature, a baking time and/or a shape of the baked product. By using identification arrangements, the production of an individual portion of a baked product is further simplified.

The device may include a deforming unit that is configured to shape the dough for the baked product. In particular, the deforming unit may be configured to shape dough into a plurality of different (optionally predefined) shapes (for example using a plurality of different baking molds). The control unit may be configured to determine a first shape from the plurality of (optionally predefined) shapes for the baked product, and to trigger shaping by the deforming unit of the dough for the baked product into the first shape. The first shape may be determined on the basis of the identification arrangements of the capsule and/or on the basis of a user input. The deforming unit thus makes possible further individualization of the baked product that is produced.

The device may include a user interface. As an alternative or in addition, a user interface may be provided by way of an electronic device (for example a mobile terminal such as a smartphone). Parameters for the baked product may be input by way of the user interface.

Here, the parameters may include for example a shape of the baked product, a degree of sweetness of the baked product and/or an amount of baking for producing the baked product. By providing a user interface, further individualization of the baked product is made possible.

The control unit may be configured to detect the fact that the capsule is or has been inserted into the receiving unit. Moreover, the control unit may be configured to start production of the baked product from the contents of the inserted capsule as a response thereto (optionally directly, without further input by a user). Thus, it is made possible for production of an individual portion of a baked product to be further simplified.

The device may include a container for receiving sweetener (for example sugar). The control unit may be configured to determine a degree of sweetness of the baked product to be produced and to trigger the supply of sweetener to the dough for the baked product, depending on the degree of sweetness. The provision of a container for receiving sweetener thus makes it possible to further individualize the baked product.

The device may include a decorating unit that is configured to apply edible material to the baked product for the purpose of decoration (for example chocolate and/or frosting). The decorating unit makes possible further individualization of the baked product.

The discharge unit may be configured to cool the baked product before it is discharged. As a result of cooling following the baking procedure in the baking unit, the procedure of producing the baked product may be made faster, since the baked product can be discharged to a user more quickly.

It should be noted that any aspects of the device that is described in this document may be combined with one another in various ways. In particular, the features of the claims may be combined with one another in various ways.

The invention will be described in more detail below with reference to an exemplary embodiment illustrated in the drawing. Here, FIG. 1 shows a block diagram of an exemplary device for producing a baked product.

As stated in the introduction, the present document addresses the individual preparation of a baked product. In this context, FIG. 1 shows a block diagram of a device 100 for producing a baked product such as a cookie. The device 100 may be provided as a domestic appliance, in particular a kitchen appliance. As an alternative, the device 100 may be provided in a public building, in a manner similar to a coffee machine, in order to provide an individual baked product, for example on payment of a fee.

The device 100 includes a control unit 101 that is configured to control the procedure of producing the baked product. A user can initiate production of the baked product by way of a user interface 102. Moreover, one or more parameters of the production procedure may be adjusted by the user by way of the user interface 102 (for example the amount by which the baked product is browned).

The device 100 includes a receiving unit 103 for receiving a capsule 113 (or a pod or cartridge). The capsule 113 may be inserted into the receiving unit 103 by a user. The receiving unit 103 may have as an opening for example a gap corresponding to the shape of the capsule 113. Inserting the capsule 113 may start the procedure of producing the baked product, optionally directly (without further input by way of the user interface 102).

The capsule 113 may contain the dough required for producing the baked product. Here, the capsule 113 typically contains only as much dough as is required for producing a baked product (for example a cookie). It is consequently possible to produce an individual portion of baked products.

Different capsules 113 may contain different dough for producing differently tasting baked products. For example, a user may insert different capsules 113 at different times so that baked products of different flavors may be produced.

The device 104 may further include a deforming unit 104 which is configured to give the dough from the capsule 113 a particular three-dimensional (3D) shape. For example, the deforming unit 104 may have one or more optionally different predefined baking molds in which the dough from a capsule 113 may be received. A baking mold may for example be selected by a user and/or in dependence on the capsule 113, and the dough may be transferred from the capsule 113 to the selected baking mold (for example being pressed into it).

The shaped dough may then be transferred (optionally in the baking mold) to a baking unit 105 (for example an oven) of the device 100. In the baking unit 105, the dough is typically baked at least partly by a heated gaseous medium 108 (for example heated air) in order to produce the baked product 115.

Following the baking procedure in the baking unit 105, the baked product 115 which has been baked may be discharged to the user by way of a discharge unit 106. The baked product 115 may optionally be cooled in the discharge unit 106 before the user is able to access the baked product 115. In this way, the possibility that the user will burn their fingers when taking the freshly produced baked product 115 is avoided.

The device 100 thus enables an individual portion of a baked product 115 (for example a single cookie) to be produced. The dough required for this may be inserted into the device 100 by way of a capsule 113. The capsule 113 may have identification arrangements, for example in the form of a QR code, a bar code, an identification number, an identification pattern, a magnetic chip and/or an external appearance of the capsule 113. On the basis of the identification arrangements, the control unit 101 can determine which baked product 115 is to be produced with the dough in the capsule 113. Moreover, production parameters such as the baking mold to be used, the baking temperature to be used, the duration of baking to be used, etc., may be determined on the basis of the identification arrangements. For this purpose, the production parameters for different baked products 115 may be stored on a storage unit 108 of the device 100. The control unit 101 can then obtain the production parameters for a baked product 115 from the storage unit 108, on the basis of the identification arrangements.

The receiving unit 103 may be configured to open the capsule 113, which is closed in air-tight manner, or to access it in a different way. The dough in the capsule 113 may be given a predetermined or user-selected 2.5-dimensional or 3-dimensional shape by the deforming unit 104. The shaped dough may then be baked by a suitable method. Here, the baking method may also include microwaving, cooking in a conveyor oven, baking in an infrared oven, microwave cooking, etc.

As an alternative to a prepared dough, a dry baking mix for a baked product 115 may also be provided using the capsule 113. The device 100 may have a water reservoir (not illustrated in FIG. 1). Moreover, the device 100 may be configured to mix the baking mix from the capsule 113 with water from the water reservoir (for example inside the deforming unit 104) in order to produce the dough for the baked product 115.

The capsule 113 is inserted into the receiving unit 103 by a user, with the receiving unit 103 being closable (for example by a hinged cover or a sliding element). It is possible by way of the identification arrangements to determine for example the type, flavor, geometry and production parameters of the baked product 115. The flavor and any further information on the baked product 115 may be output by way of the user interface 102 (for example by way of a display on the device 100). By way of the user interface 102, it is optionally additionally possible to select the hardness of the baked product 115 and/or the sugar content of the baked product 115 individually. Similarly, by way of the user interface 102 it is optionally possible for the user to select the shape of the baked product 115 from a given selection list.

Once settings have been selected, the production procedure can be initiated by the user by way of the user interface 102. As an alternative to input by way of a user interface 102 of the device 100, it is optionally possible to provide an interface by way of a mobile device (for example a smartphone or a tablet PC) that is connected to the device 100 by way of a wireless interface such as Bluetooth, W-LAN, NFC, etc.

The dough is processed, shaped and baked in the interior of the device 100 (in particular in the deforming unit 104 and the baking unit 105). The finished baked product 115 is discharged by way of a discharge unit 106, for example at a delivery point of the device 100.

The electrical energy required for operation of the device 100 may be provided for example by way of a hard-wired mains connection, a magnetic field and/or solar cells.

The device 100 may include a decorating unit (not illustrated in FIG. 1) that is configured to embellish the baked product 115 before it is discharged (for example with chocolate, frosting or food colorant).

The device 100 described in this document enables a baked product 115 (for example a single cookie) to be produced efficiently and individually. Different baked products 115 may be selected by inserting different capsules 113. Moreover, the device 100 makes possible optional further individualization as regards the shape, composition, sweetness (sugar content) and/or hardness (duration of baking) of the baked product 115.

The present invention is not restricted to the exemplary embodiments shown. In particular, it should be noted that the description and the figures are only intended to illustrate the principle of the proposed device.

The invention claimed is:

1. A system including a device for producing an individual portion of a baked product and a compact capsule, wherein the capsule includes a quantity of contents that is exactly sufficient for producing the individual portion of baked product; wherein the contents include a baking mix for the baked product; wherein the device includes
a receiving unit that is configured to receive a compact capsule, wherein the receiving unit has an opening through which the capsule can be inserted into the device; and wherein the receiving unit is configured to open the capsule in order to release the contents;
a mixer that is configured to produce, from the baking mix contained in the capsule, a dough for the baked product;
a baking unit that is configured to bake the dough;
a control unit that is configured to trigger
the production of the dough from the baking mix of the capsule inserted into the receiving unit;
the baking of the dough into the baked product in the baking unit; wherein
the device has a discharge unit for receiving the baked product form the baking unit and for discharging the baked product that has been baked in the baking unit, the discharge unit being positioned downstream from the baking unit, wherein the control unit is configured to output the baked product from the baking unit to the discharge unit; wherein
the discharge unit is configured to support and cool the baked product before it is discharged.

2. The system as claimed in claim 1, wherein the baking unit is configured to bake the dough at least partly by the action of a heated gaseous medium.

3. The system as claimed in claim 1, in which the device includes a container for receiving a liquid, and whereof the mixer is configured to produce the dough from the baking mix and the liquid from the container.

4. The system as claimed in claim 1, wherein
a. the capsule has an identification arrangement; and
b. the control unit is configured to determine, on the basis of the identification arrangements, information on the baked product that can be produced from the contents of the capsule.

5. The system as claimed in claim 4, wherein the identification arrangements include one or more of: a QR code, a bar code, a magnetic chip, an electronic chip, an external appearance of the capsule, an identification pattern and/or an identification number.

6. The system as claimed in claim 4, wherein the information on the baked product includes one or more of: a baking temperature, a baking time and/or a shape of the baked product.

7. The system as claimed in claim 1, wherein the device includes a deforming unit that is configured to shape the dough for the baked product.

8. The system as claimed in claim 7, wherein
a. the deforming unit is configured to shape dough into a plurality of different shapes; and
b. the control unit is configured to determine a first shape from the plurality of shapes for the baked product, and to trigger shaping by the deforming unit of the dough for the baked product into the first shape.

9. The system as claimed in claim 1, wherein
a. parameters for the baked product may be input by way of a user interface; and
b. the parameters include one or more of: a shape of the baked product, a degree of sweetness of the baked product and/or an amount of baking for producing the baked product.

10. The system as claimed in claim 1, wherein the control unit is configured
a. to detect the fact that the capsule is inserted into the receiving unit; and
b. to trigger production of the baked product from the contents of the inserted capsule as a response thereto.

11. The system as claimed in claim 1, wherein
a. the device includes a container for receiving sweetener; and
b. the control unit is configured to determine a degree of sweetness of the baked product to be produced and to trigger the supply of sweetener to the dough for the baked product, depending on the degree of sweetness.

12. The system as claimed in claim 1, wherein the device includes a decorating unit that is configured to apply edible material to the baked product for the purpose of decoration.

13. The system as claimed in claim 1, wherein the control unit is configured to control cooling in the discharge unit.

* * * * *